(12) United States Patent
Hareuveni et al.

(10) Patent No.: US 11,751,264 B2
(45) Date of Patent: *Sep. 5, 2023

(54) APPARATUS, SYSTEM AND METHOD OF CONCURRENT MULTIPLE BAND (CMB) NETWORK ACCESS

(71) Applicant: INTEL CORPORATION, Santa Clara, CA (US)

(72) Inventors: Ofer Hareuveni, Haifa (IL); Daniel Cohn, Raanana (IL); David Birnbaum, Modiin (IL); Ehud Reshef, Qiryat Tivon (IL); Dor Chay, Haifa (IL); Sivan Koffler, Raanana (IL)

(73) Assignee: INTEL CORPORATION, Santa Clara, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/472,932

(22) Filed: Sep. 13, 2021

(65) Prior Publication Data

US 2022/0070955 A1 Mar. 3, 2022

Related U.S. Application Data

(63) Continuation of application No. 16/726,884, filed on Dec. 25, 2019, now Pat. No. 11,122,638.

(51) Int. Cl.
*H04W 76/15* (2018.01)
*H04W 80/02* (2009.01)
(Continued)

(52) U.S. Cl.
CPC ......... *H04W 76/15* (2018.02); *H04L 61/5014* (2022.05); *H04W 12/068* (2021.01); *H04W 80/02* (2013.01); *H04W 84/12* (2013.01)

(58) Field of Classification Search
None
See application file for complete search history.

(56) References Cited

U.S. PATENT DOCUMENTS 8,880,007 B1 11/2014 Mansour et al.
10,263,667 B2 4/2019 Zakaria et al.
(Continued)

FOREIGN PATENT DOCUMENTS

CA 2 910 079 10/2014
EP 1 616 411 1/2006
(Continued)

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Hong S Cho
(74) *Attorney, Agent, or Firm* — Shichrur & Co.

(57) ABSTRACT

For example, a wireless communication device may be configured to, while communicating via a first radio of the wireless communication device over a first network connection in a first WLAN over a first wireless communication frequency band, identify a second WLAN over a second wireless communication frequency band for Concurrent Multiple Band (CMB) network access, the second wireless communication frequency band different from the first wireless communication frequency band; based on identifying the second WLAN, to automatically transmit from a second radio of the wireless communication device user credentials to establish a second network connection with the second WLAN over the second wireless communication frequency band, the second network connection concurrent with the
(Continued)

first network connection; and to concurrently communicate over the first and second network connections by routing to the first and second radios a plurality of application streams corresponding to one or more applications.

24 Claims, 10 Drawing Sheets

(51) Int. Cl.
*H04W 12/06* (2021.01)
*H04L 61/5014* (2022.01)
*H04W 84/12* (2009.01)

(56) References Cited

U.S. PATENT DOCUMENTS

| | | | |
|---|---|---|---|
| 10,531,360 | B1 | 1/2020 | Govindassamy |
| 10,819,566 | B2 | 10/2020 | Chew |
| 10,849,171 | B2 | 11/2020 | Iwami et al. |
| 11,019,183 | B2 | 5/2021 | Alam |
| 11,038,895 | B2 | 6/2021 | Bartfai-Walcott et al. |
| 11,122,638 | B2 | 9/2021 | Hareuveni et al. |
| 2003/0033394 | A1 | 2/2003 | Stine |
| 2005/0201296 | A1 | 9/2005 | Vannithamby et al. |
| 2009/0147722 | A1 | 6/2009 | Ramachandran |
| 2009/0225658 | A1 | 9/2009 | Rezvani et al. |
| 2010/0026547 | A1 | 2/2010 | Weissman et al. |
| 2010/0136998 | A1 | 6/2010 | Lott et al. |
| 2011/0111780 | A1 | 5/2011 | Hillan et al. |
| 2011/0149764 | A1 | 6/2011 | Wietfeldt et al. |
| 2012/0236713 | A1 | 9/2012 | Kakadia et al. |
| 2012/0294161 | A1 | 11/2012 | Sunay et al. |
| 2012/0307886 | A1 | 12/2012 | Agarwal et al. |
| 2014/0169192 | A1 | 6/2014 | Zhang et al. |
| 2014/0269461 | A1* | 9/2014 | Mehta ............... H04W 76/15 370/297 |
| 2015/0304879 | A1 | 10/2015 | Dacosta |
| 2018/0167948 | A1 | 6/2018 | Egner et al. |
| 2018/0183468 | A1* | 6/2018 | Emmanuel ............ H04W 72/04 |
| 2019/0272187 | A1 | 9/2019 | Smith et al. |
| 2020/0107338 | A1 | 4/2020 | Egner et al. |
| 2020/0145967 | A1 | 5/2020 | Park et al. |
| 2020/0259737 | A1 | 8/2020 | Koshy et al. |
| 2021/0067505 | A1 | 3/2021 | Gandhi et al. |
| 2021/0204163 | A1 | 7/2021 | Cohn et al. |
| 2021/0204340 | A1 | 7/2021 | Hareuveni et al. |
| 2021/0409089 | A1 | 12/2021 | Haider et al. |
| 2022/0201541 | A1 | 6/2022 | Cohn et al. |

FOREIGN PATENT DOCUMENTS

| | | |
|---|---|---|
| WO | 02/078229 | 10/2002 |
| WO | 2008/064186 | 5/2008 |
| WO | 2011123839 | 10/2011 |

OTHER PUBLICATIONS

Killer DoubleShot Pro—Killer Networking | Killernetworking | Killer Control Center; retrieved from www.killernetworking.com/technologies/killer-doubleshot-pro/[Mar. 8, 2020 9:44:20 AM], 2 pages.
Office Action for U.S. Appl. No. 16/726,882, dated May 26, 2021, 27 pages.
Notice of Allowance for U.S. Appl. No. 16/726,882, dated Sep. 7, 2021, 17 pages.
Notice of Allowance for U.S. Appl. No. 16/726,884, dated May 13, 2021, 14 pages.
Office Action for U.S. Appl. No. 17/561,557, dated Dec. 15, 2022, 28 pages.
Notice of Allowance for U.S. Appl. No. 17/561,557, dated Mar. 30, 2023, 11 pages.

* cited by examiner

400

510  510

APPARATUS, SYSTEM AND METHOD OF CONCURRENT MULTIPLE BAND (CMB) NETWORK ACCESS

TECHNICAL FIELD

Embodiments described herein generally relate to Concurrent Multiple Band (CMB) network access.

BACKGROUND

Some wireless network adapters may allow concurrent communication over multiple network interfaces—in the context of Wi-Fi these are called Basic Service Sets (BSSs). In the context of other technologies other names may be used. The BSSs may be in different wireless communication bands, e.g., a 2.4 Gigahertz (GHz) band, a 5 GHz band, and/or in a 6-7 GHz band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
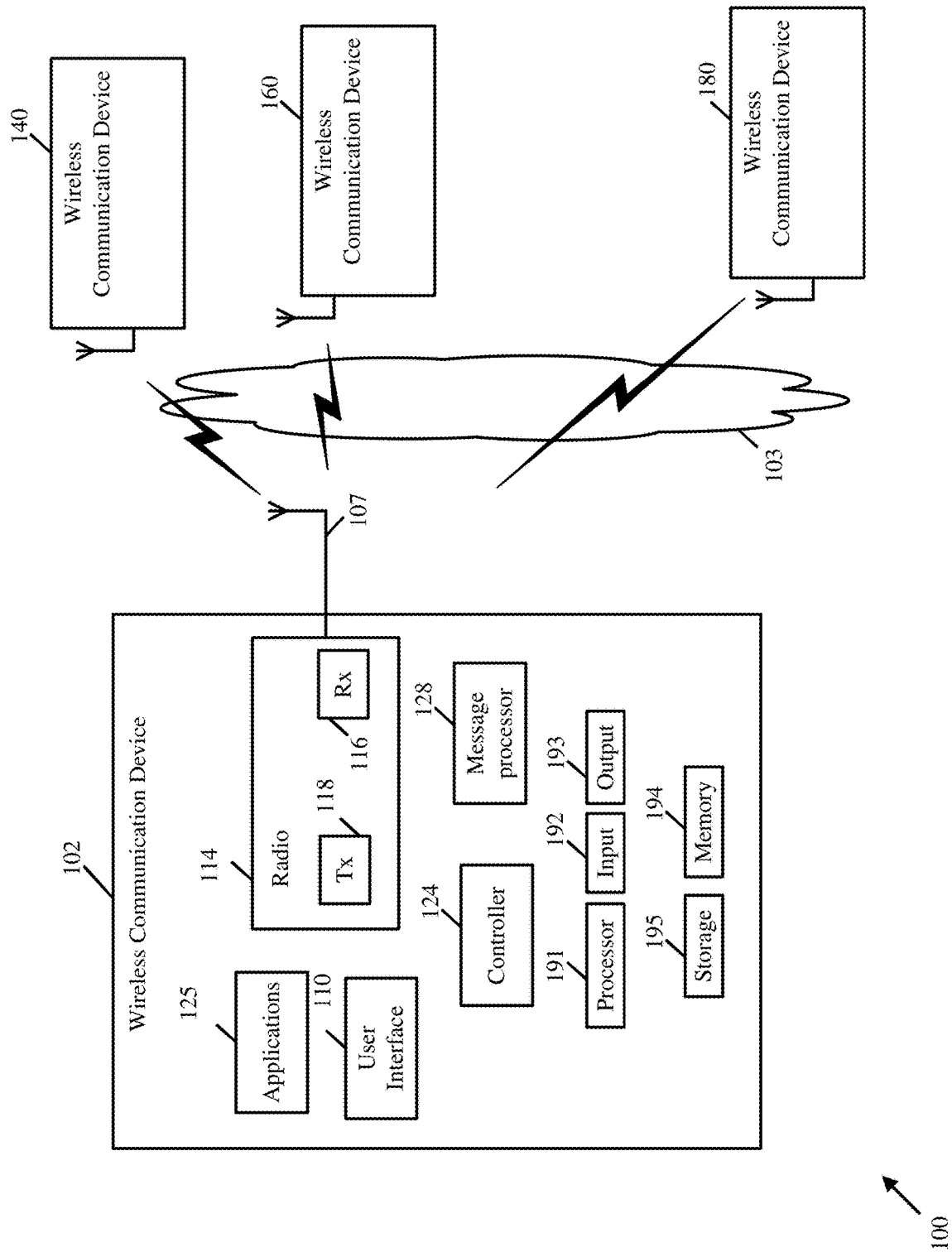
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)), and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, 5 GHz, and/or 6-7 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), a Wi-Fi Aware communication, or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, devices 102, 140, 160 and/or 180 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one or more of wireless communication devices 102, 140, 160 and/or 180, e.g., devices 140, 160 and/or 180, may include, operate as, and/or perform the functionality of an Access Point (AP) STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a 6-7 GHz frequency band, a milli-meterWave (mmWave) frequency band, e.g., a 60 GHz frequency band, a Sub-1 GHz (S1G) band, and/or any other frequency band.

In some demonstrative embodiments, devices 102, 140, 160 and/or 180 may include one or more radios including circuitry and/or logic to perform wireless communication between devices 102, 140, 160 and/or 180, and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, a 6 GHz frequency band, e.g., a 6-7 GHz frequency band, a mmWave band, a S1G band, and/or any other band.

In some demonstrative embodiments, radio 114 may include, or may be associated with, one or more antennas 107.

In one example, device 102 may include a single antenna 107. In another example, device may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160 and/or 180 may form, or may communicate as part of, a wireless local area network (WLAN).

In some demonstrative embodiments, wireless communication devices 102, 140, 160 and/or 180 may form, or may communicate as part of, a Wi-Fi network.

In other embodiments, wireless communication devices 102, 140, 160 and/or 180 may form, and/or communicate as part of, any other additional or alternative network.

In some demonstrative embodiments, devices 140, 160 and/or 180 may include, operate as, perform the role of, and/or perform one or more functionalities of an AP STA.

In some demonstrative embodiments, device 102 may include, operate as, perform the role of, and/or perform one or more functionalities of, one or more STAs. For example, device 102 may include at least one STA.

In some demonstrative embodiments, radio 114 may include a plurality of radios 114 connected to one or more antennas 107.

In some demonstrative embodiments, device 102 may include one or more applications 125 to provide one or more services, operations, and/or information to a user of device 102, for example, from the Internet, and/or any other network.

In some demonstrative embodiments, device 102 and/or radios 114 may be configured to allow concurrent communication with a plurality of Basic Service Sets (BSSs), e.g., as described below.

In some demonstrative embodiments, the plurality of BSSs may be in different wireless communication frequency bands. For example, the plurality of BSSs may be in a 2.4 Gigahertz (GHz) band, a 5 GHz band, a 6 GHz band, and/or any other band.

In some demonstrative embodiments, the plurality of radios 114 may be configured to communicate in the plurality of BSSs, for example, by communicating over a Concurrent Multiple Band (CMB) network access in the 2.4 GHz band, the 5 GHz band, and/or the 6 GHz band.

In some demonstrative embodiments, the CMB network access may be defined as a concurrent communication over multiple bands, e.g., in the plurality of BSSs.

In some demonstrative embodiments, the CMB network access may be configured for concurrent network access over a plurality of wireless communication frequency bands, which may include at least first and second wireless communication frequency bands having a sufficient spectral separation from each other.

In some demonstrative embodiments, the first wireless communication frequency band may include, for example, a first frequency band, sub-band, channel and/or frequency range, and the second wireless communication frequency band may include, for example, a second frequency band, sub-band, channel and/or frequency range, which may have sufficient spectral separation from the first frequency band, sub-band, channel and/or frequency range.

In one example, the first wireless communication frequency band may include a first frequency band and/or a first sub-band, channel and/or frequency range in the first frequency band, for example, a first band of a 2.4 GHz band, a 5 GHz band, a 6-7 GHz band, a 60 GHz band, and/or any other band; and the second wireless communication frequency band may include a second frequency band and/or a second sub-band, channel and/or frequency range in the second frequency band, for example, a second band, different from the first band, e.g., of the 2.4 GHz band, the 5 GHz band, the 6-7 GHz band, a 60 GHz band, and/or any other band. For example, the first wireless communication frequency band may be in the 2.4 GHz band, and the second wireless communication frequency band may be in the 6-7 GHz band.

In some demonstrative embodiments, the first and second wireless communication frequency bands may be within a same frequency band. For example, the first wireless communication frequency band may include, for example, a first frequency band, sub-band, channel and/or frequency range, within a particular frequency band, and the second wireless communication frequency band may include, for example, a second frequency band, sub-band, channel and/or frequency range, within the same particular frequency range, for example, with sufficient spectral separation from the first frequency band, sub-band, channel and/or frequency range.

In one example, the first wireless communication frequency band may include a first frequency band and/or a first sub-band, channel and/or frequency range in the 5 GHz band, and the second wireless communication frequency band may include a second frequency band and/or a first sub-band, channel and/or frequency range in the 5 GHz band, for example, with sufficient spectral separation from the first frequency band, sub-band, channel and/or frequency range.

In another example, the first wireless communication frequency band may include a first frequency band and/or a first sub-band, channel and/or frequency range in a 5-7 GHz band, e.g., within a frequency range 5-6 GHz, and the second wireless communication frequency band may include a second frequency band and/or a first sub-band, channel and/or frequency range in the 5-7 GHz band, e.g., within a frequency range 6-7 GHz.

In some demonstrative embodiments, the CMB network access may be configured to allow achieving higher data rates, providing a better Quality of Service (QoS), and/or any other performance enhancements.

In one example, the CMB network access may be configured to improve user QoS, for example, especially for latency-sensitive applications, e.g., gaming, conversational voice and video, for example, especially in congested WiFi environments.

In one example, regulatory developments that release additional spectrum allocation for unlicensed wideband wireless communication, emerging products that support multi-radio, multi-band, wireless capabilities in mobile devices, and/or a growing need to enable new usages for high throughput and low latency networking and mobility, may drive products that support concurrent multiple wireless connections.

In some demonstrative embodiments, the concurrent multiple wireless connections may include concurrent wireless connections to a single multi-band AP, e.g., as described below.

In some demonstrative embodiments, the concurrent multiple wireless connections may include concurrent wireless connections to a multiple APs in a same sub-net, e.g., APs that share a same Service Set Identifier (SSID) and a same Dynamic Host Configuration Protocol (DHCP) server, e.g., as described below.

In some demonstrative embodiments, the concurrent multiple wireless connections may include and/or concurrent wireless connections to different APs operating on different SSIDs, subnets, and DHCP servers, e.g., as described below.

In some demonstrative embodiments, there may be a need to address one or more technical inefficiencies, disadvantages and/or problems in one or more use cases and/or scenarios, for example, when communicating over concurrent multiple wireless connections, e.g., as described below.

In one example, while an availability of concurrent wireless connections may be valuable to achieve an increased user experience and/or to enable new mobile usages, the concurrent wireless connections may create new challenges of user experience, device provisioning and/or user authentication, policy enforcement, e.g., when operating under IT managed networks, security, and/or roaming within network, e.g., when at least one concurrent wireless connection is to a separate AP or to a local network.

In some demonstrative embodiments, device 102 may be configured to support multiple concurrent wireless connections, for example, in a manner which may enable seamless and/or optimal concurrent multiple network connections over a wireless medium, e.g., as described below.

In one example, device 102 may support concurrent wireless connections, for example, using one or more operations and/or methods, which may not require modifications to one or more IEEE 802.11 Standards.

In some demonstrative embodiments, one or more implementations to support concurrent wireless connections may have one or more technical inefficiencies, disadvantages and/or technical problems in one or more use cases and/or scenarios, e.g., as described below.

In one example, it may be inefficient to use concurrent connections, e.g., over Wi-Fi and a wired LAN, with static allocation of network access of an application to a connection.

In another example, it may be inefficient to use concurrent connections to a single multi-band AP and/or to two APs sharing a subnet with static allocation of network access of an application to a frequency band.

In another example, it may be inefficient to use concurrent connections, for example, in a cellular network using licensed and/or unlicensed bands, such that applications and/or a networking stack may not be aware of the multiple connections and have no control on traffic steering. Such connections, such as Interworking, LTE-WLAN aggregation (LWA) and/or LTE WLAN Radio Level Integration with IPsec Tunnel (LWIP), which may be part of 3GPP standards may require support and configuration protocols between a network and a UE to a single multi-band AP and/or to two APs sharing a subnet with static allocation of network access of an application to a frequency band.

In another example, it may be inefficient to use Multipath IP layer protocols, for example, a Multipath Transmission Control Protocol (MP-TCP) and/or Quick UDP Internet Connections (QUIC), which may require point to point support.

In some demonstrative embodiments, one or more of the implantations listed above may maintain a multiple connection active, for example, regardless of current application needs, and, therefore may increase a platform power consumption.

In some demonstrative embodiments, one or more of the implantations listed above may be limited, for example, only to multiple connections within a single subnet.

In some demonstrative embodiments, one or more of the implantations listed above may require protocol and/or management support by the network.

In some demonstrative embodiments, one or more of the implantations listed above may degrade a user experience, for example, as the user needs to manage login and credentials for each of the connections separately, for example, when connecting to a hotspot.

In some demonstrative embodiments, one or more of the implantations listed above may not address an ability of network managers to provision and/or configure mobile devices with such capabilities.

In some demonstrative embodiments, one or more of the implantations listed above may not be agnostic to applications that produce or consume the concurrent link.

In some demonstrative embodiments, one or more of the implantations listed above may have high cost, for example, at a silicon level, board level and/or RF front end; may have a complicated mechanical design, for example, due to a need for additional components; may reduce a battery life; and/or may add SW complexity. Therefore, there may be a need for providing end customers and/or corporate buyers with usage of concurrent wireless connections as seamless as possible to use, and/or to benefit from premium services provided by the concurrent wireless connections in as many as possible scenarios.

In some demonstrative embodiments, device 102 may be configured to support optimized and/or seamless CMB network access, for example, when concurrent wireless connections are established, e.g., as described below.

In some demonstrative embodiments, device 102 may be configured to support enabling concurrent wireless connections with a single set of credentials and/or service provider subscription, e.g., as described below.

In some demonstrative embodiments, device 102 may be configured to support IT provisioning of a UE having multiple connection capabilities, e.g., as described below.

In some demonstrative embodiments, device 102 may be configured to support radio concurrency limitations, which may impact channel and/or AP selection for each concurrent wireless connection of the concurrent wireless connections, for example, to achieve an increased user experience in any given scenario, e.g., as described below.

In some demonstrative embodiments, device 102 may be configured to support providing optimized utilization of available radio resources in multiple environments, for example, such as an enterprise, home, venue and/or hotspot, e.g., as described below.

In some demonstrative embodiments, device 102 may be configured to support one or mechanisms and/or operations, for example, for managing discovery, authentication, security and/or connection establishment, mobility and connection maintenance, for example, in a way transparent to the user, while considering performance and/or power consumption, e.g., as described below.

In some demonstrative embodiments, device 102 may be configured to support concurrent wireless communication over a plurality of network connections, e.g., as described below.

In some demonstrative embodiments, controller 124 may be configured to control, cause and/or trigger the STA implemented by device 102 to, while communicating via a first radio of radios 114 of device 102 over a first network connection in a first Wireless Local Area Network (WLAN) over a first wireless communication frequency band, identify a second WLAN over a second wireless communication frequency band for CMB network access, e.g., as described below.

In some demonstrative embodiments, the second wireless communication frequency band may be different from the first wireless communication frequency band, e.g., as described below.

In some demonstrative embodiments, at least one of the first and second wireless communication frequency bands may include a 2.4 Gigahertz (GHz) band, a 5 GHz band, or a 6-7 GHz band, e.g., as described below.

In some demonstrative embodiments, the first and second wireless communication frequency band may include two frequency ranges, two sub bands, or two channels of a same wireless communication frequency band.

In some demonstrative embodiments, the first wireless communication frequency band may be a first sub-band in a particular frequency band, and the second wireless communication frequency band may be a second sub-band in the particular frequency band, e.g., as described below.

In one example, the first and second wireless communication frequency bands may be in a 5-7 GHz frequency band. For example, the first wireless communication frequency band may include a frequency band, range, channel and/or sub-band in a frequency range between 5 GHz and 6 GHz, and the second wireless communication frequency band may a frequency band, range, channel and/or sub-band in a frequency range between 6 GHz and 7 GHz.

In another example, the first wireless communication frequency band may include a first frequency range, channel and/or sub-band in the 5 GHz frequency band, and the second wireless communication frequency band may include a second frequency range, channel and/or sub-band in the 5 GHz frequency band, for example, such that the first and second frequency ranges have a sufficient spectral separation between them.

In some demonstrative embodiments, the first wireless communication frequency band may be in a first frequency band, and the second wireless communication frequency band may be in a second frequency band, different from and/or separated from, the first frequency band, e.g., as described below.

In one example, the first wireless communication frequency band may include a first frequency band, sub-band, channel and/or range in a 2.4 Ghz frequency band, and the second wireless communication frequency band may include a second frequency band, sub-band, Channel and/or range in a 5 GHz frequency band.

In another example, the first wireless communication frequency band may include a first frequency band, sub-band, channel and/or range in a 5 Ghz frequency band, and the second wireless communication frequency band may include a second frequency band, sub-band, Channel and/or range in a 6-7 GHz frequency band.

In some demonstrative embodiments, controller 124 may be configured to control, cause and/or trigger the STA implemented by device 102 to, based on identifying the second WLAN, automatically transmit from a second radio of radios 114 of device 102 user credentials to establish a second network connection with the second WLAN over the second wireless communication frequency band, e.g., as described below.

In some demonstrative embodiments, the second network connection may be concurrent with the first network connection, e.g., as described below.

In some demonstrative embodiments, the user credentials to establish the second network connection may include a username, a password, a Media Access Control (MAC) address, a device barcode, an access code, an acceptance of terms and conditions, and/or any other additional or alternative information, e.g., as described below.

In one example, the user credentials to establish the second network connection may include, for example, a subscription to a service, e.g., paid or unpaid services, captive portal information, e.g., information of an hotel guest, and/or enterprise network access.

In some demonstrative embodiments, controller 124 may be configured to control, cause and/or trigger the STA implemented by device 102 to concurrently communicate over the first and second network connections by routing to the first and second radios of radios 114 a plurality of application streams corresponding to one or more applications 125 to be executed by device 102, e.g., as described below.

In some demonstrative embodiments, the first and second network connections may be with a same AP. For example, the first and second network connections may be with device 140.

In some demonstrative embodiments, the first network connection may be with a first AP, and the second network connection may be with a second AP, e.g., different from the first AP. For example, the first network connection may be with device 140, and second network connection may be with device 160.

In some demonstrative embodiments, controller 124 may be configured to control, cause and/or trigger the STA implemented by device 102 to map a first Internet Protocol (IP) address and a second IP address to a same local IP address, for example, for use by the one or more applications 125, e.g., as described below.

In some demonstrative embodiments, the first IP address may be for communication by the first radio over the first network connection, and/or the second IP address may be for communication by the second radio over the second network connection, e.g., as described below.

In some demonstrative embodiments, the first and second WLANs may share a same Service Set Identifier (SSID), and/or may share a same Dynamic Host Configuration Protocol (DHCP) server, e.g., as described below.

In some demonstrative embodiments, controller 124 may be configured to control, cause and/or trigger the STA implemented by device 102 to automatically transmit to the second WLAN user credentials of the first network connection, e.g., as described below.

In one example, the user credentials of the first network connection may include a username, a password, a MAC address, a device barcode, an access code, an acceptance of terms and conditions, and/or any other additional or alternative information, e.g., as described below.

In some demonstrative embodiments, controller 124 may be configured to control, cause and/or trigger the STA implemented by device 102 to establish the second network connection using same security credentials of the first network connection, e.g., as described below.

In some demonstrative embodiments, the first WLAN may have a first SSID, and the second WLAN may have a second SSID different from the first SSID, e.g., as described below.

In some demonstrative embodiments, controller 124 may be configured to control, cause and/or trigger the STA implemented by device 102 to automatically retrieve a user profile corresponding to the second SSID from a memory of device 102, for example, memory 194, e.g., as described below.

In some demonstrative embodiments, the user profile may include user credentials corresponding to the second SSID, e.g., as described below.

In some demonstrative embodiments, controller 124 may be configured to control, cause and/or trigger the STA implemented by device 102 to transmit to the second WLAN the user credentials corresponding to the second SSID, e.g., as described below.

In some demonstrative embodiments, controller 124 may be configured to control, cause and/or trigger the STA implemented by device 102 to automatically retrieve from the user profile security credentials corresponding to the second SSID, and to establish the second network connection using the security credentials corresponding to the second SSID, e.g., as described below.

In some demonstrative embodiments, device 102 may be configured to selectively enable or disable the CMB network access, e.g., as described below.

In some demonstrative embodiments, controller 124 may be configured to control, cause and/or trigger the STA implemented by device 102 to selectively enable or disable the CMB network access, for example, based on one or more predefined criteria, e.g., as described below.

In some demonstrative embodiments, controller 124 may be configured to control, cause and/or trigger the STA implemented by device 102 to selectively enable or disable the CMB network access, for example, based on a power mode of device 102, e.g., as described below.

In one example, device 102 may selectively enable or disable the CMB network access, for example, based on whether device 102 is powered by a mains power or by a battery.

In some demonstrative embodiments, controller 124 may be configured to control, cause and/or trigger the STA implemented by device 102 to selectively enable or disable the CMB network access, for example, based on an interference between the first and second network connections, e.g., as described below.

In some demonstrative embodiments, controller 124 may be configured to control, cause and/or trigger the STA implemented by device 102 to selectively enable or disable the CMB network access, for example, based on a throughput criterion, a latency criterion, a stability criterion, and/or a channel condition criterion, e.g., as described below.

In some demonstrative embodiments, the throughput criterion may relate to a required throughput for the application streams and an available throughput of at least one of the first and second network connections e.g., as described below.

In some demonstrative embodiments, the latency criterion may relate to a required latency for the application streams, and a latency of the first and/or second network connections, e.g., as described below.

In some demonstrative embodiments, the stability criterion may relate to a stability of the first and/or second network connections, e.g., as described below.

In some demonstrative embodiments, the network condition criterion may relate to a channel condition of the first and/or second network connections, e.g., as described below.

In some demonstrative embodiments, controller 124 may be configured to control, cause and/or trigger the STA implemented by device 102 to selectively enable or disable the CMB network access, for example, based on any other additional or alternative criterion, parameter attribute and/or information.

In some demonstrative embodiments, device 102 may include a user interface 110 configured to interface with a user of device 102, e.g., as described below.

In some demonstrative embodiments, controller 124 may be configured to control, cause and/or trigger the STA implemented by device 102 to cause user interface 110 of device 102 to provide to the user of device 102 a concurrent connection indication to concurrently indicate a connection state of the first and second network connections, e.g., as described below.

Figure 2:
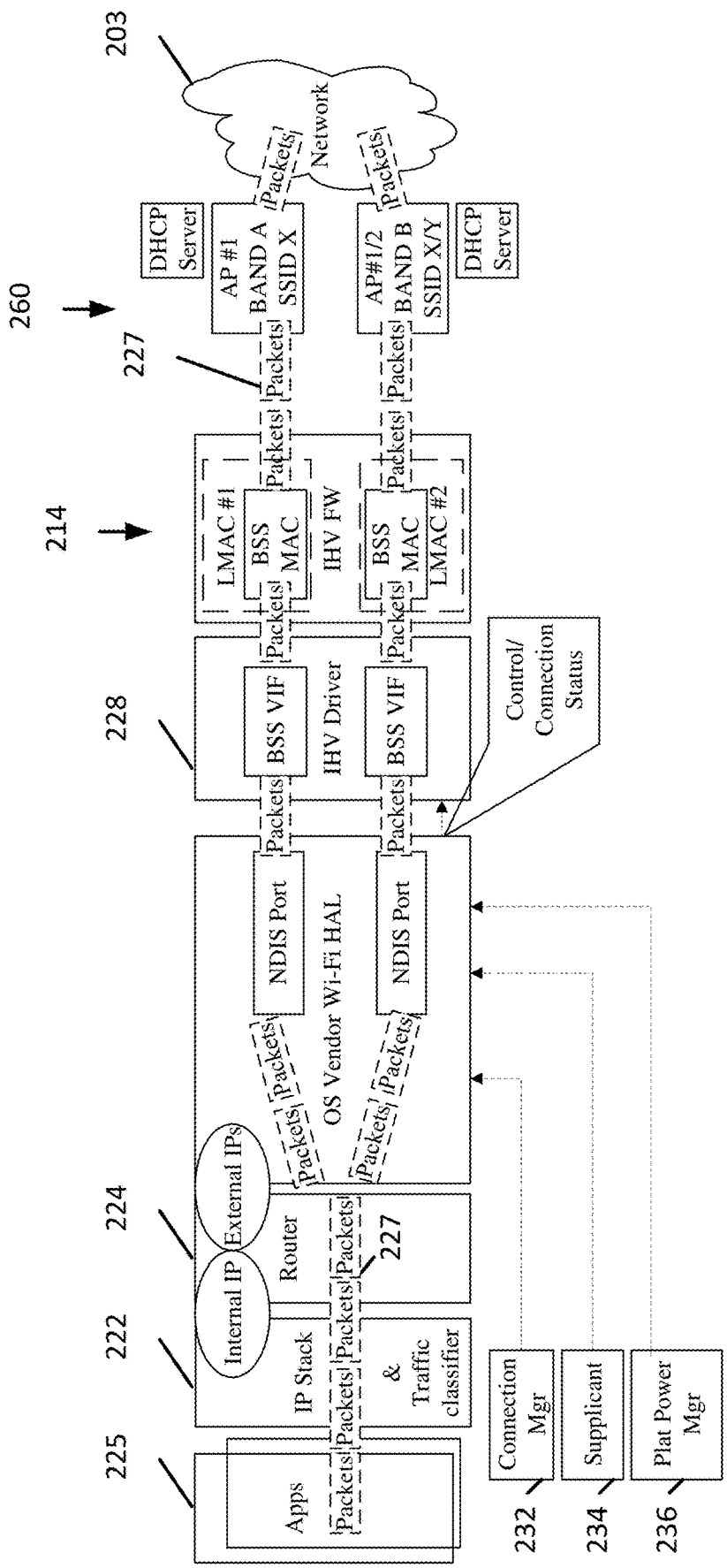
FIG. 2 is a schematic block diagram illustration of a Concurrent Multiple Band (CMB) network architecture, in accordance with some demonstrative embodiments.

Reference is made to FIG. 2, which schematically illustrates a block diagram of a CMB network architecture 200, in accordance with some demonstrative embodiments.

In some demonstrative embodiments, CMB network architecture 200 may be configured to support a plurality of concurrent network connections with a plurality of WLANs.

In some demonstrative embodiments, one or more elements of CMB network architecture 200 may be implemented by device 102 (FIG. 1), e.g., by controller 124 (FIG. 1), message processor 128 (FIG. 1), and/or one or more other elements of device 102 (FIG. 1), to support the CMB network access with the devices 140, 160 and/or 180 (FIG. 1).

In some demonstrative embodiments, CMB network architecture 200 may include a connection manager 232, which may be configured to manage and/or control the CMB network access, e.g., as described below. For example, controller 124 (FIG. 1) may be configured to perform one or more functionalities and/or operations of connection manager 232.

In some demonstrative embodiments, connection manager 232 may be configured to set up and/or control at least a first network connection with a first WLAN, e.g., a first connection and a second network connection with a first WLAN, e.g., concurrently, as described below.

In some demonstrative embodiments, as shown in FIG. 2, CMB network architecture 200 may include a CMB router 224 configured to route a plurality of application streams between the plurality of network connections.

In some demonstrative embodiments, as shown in FIG. 2, CMB router 224 may be implemented in a device, e.g., device 102 (FIG. 1), for example, as part of an operating system of the device, as a middleware between an operating system network stack and/or wireless NIC drivers, e.g., drivers of radios 114 (FIG. 1), and/or by any other component of the device. For example, controller 124 (FIG. 1) may include, operate as, perform one or more operations of, and/or perform the functionality of, CMB router 224.

In some demonstrative embodiments, as shown in FIG. 2, CMB router 224 may be configured to route packets 227 of one or more applications 225 with a network 203, e.g., the Internet.

In some demonstrative embodiments, as shown in FIG. 2, a plurality of radios 214, e.g., including at least two radios denoted "LMAC #1" and "LMAC #2", may communicate with a plurality of APs 260, including at least two APs denoted "AP #1" and "AP #2", e.g., devices 140, 160 and/or 180 (FIG. 1). In one example, each AP 260 may communicate over a different wireless communication band, and, optionally in a different BSS.

In some demonstrative embodiments, the CMB router 224 may determine how to split the traffic 227 between the plurality of radios 214.

In one example, the traffic split may occur at different network model layers, e.g., a MAC Control Protocol (TCP) layer, an Internet Protocol (IP) layer, a MAC layer, and the like. The traffic may be aggregated at some point in the network, e.g., at the AP, or some anchor point in the cloud or network, or it may stay split until the other end.

In some demonstrative embodiments, an IP stack 222 may be implemented by a UE, e.g., device 102 (FIG. 1), to handle a traffic split on uplink, and a traffic combining on downlink, for example, when connecting to a single dual band AP, which may be identified as two separate devices, for example, not as a single logical entity, e.g., as described below.

In one example, IP stack 222 may handle the traffic split, for example, assuming each radio 214, e.g., each MAC of LMAC #1 and LMAC #2 has a separate and unique MAC address, for example, to preserve common rules of networking. In one example, the MAC addresses may be consecutive, however, this may not be assumed as always being right.

In some demonstrative embodiments, connection manager 232 may be configured to track capabilities, link status and system state and control one or more operations of one or more elements of CMB architecture 200, e.g., as described below.

In some demonstrative embodiments, connection manager 232 may be configured to maintain a first wireless network connection as a primary connection or swap between the first wireless network connection and a second wireless network connection, which may become a primary connection.

In some demonstrative embodiments, connection manager 232 may be configured to establish connection to a second wireless network, for example, if the second wireless network is available and not connected to.

In some demonstrative embodiments, connection manager 232 may be configured to disconnect a second wireless network, for example, if the second wireless network is not required, e.g., when the first wireless network is significantly better.

In some demonstrative embodiments, connection manager 232 may be configured to search for an alternative wireless network or swap between the first and second wireless networks, for example, if any of the first and second wireless networks is indicating deterioration, e.g., a signal strength is deteriorating and/or no roaming candidate is identified.

In some demonstrative embodiments, connection manager 232 may be configured to switch from using a single wireless connection to using multiple wireless connections, for example, when a mobile device setting is changed from performance mode to power efficiency mode, for example, either by user control or by an OS control, e.g., due to battery change level.

In some demonstrative embodiments, the IP stack 222 and/or router 224 (FIG. 2) may be configured to negotiate an IP address for each of the available connections.

In some demonstrative embodiments, IP stack 222 may include an address translation capability, for example, for application seeing a single IP, e.g., as described below with reference to FIG. 6.

In some demonstrative embodiments, there may be a plurality of scenarios of network access combinations, for example, based on co-location of the APS, SSIDs, configuration of AP #1, AP #2 and their backbone networks, and/or any other parameters or attributes of the APs, the network, or any other element in CMB network architecture 200.

In some demonstrative embodiments, device 102 (FIG. 1) may be configured to provide an increased user experience and performance for one or more scenarios of network access combinations. In one example, the one or more scenarios of network access combinations may provide a solution to additional scenarios, which may be addressed by various subsets and/or implementations of the one or more scenarios of network access combinations described herein.

In some demonstrative embodiments, device 102 (FIG. 1) may be configured to support a first scenario of network access, in which AP #1 and AP #2 may be collocated or non-collocated, sharing a subnet, having a shared SSID and security credentials, operating on different bands, and sharing a same DHCP server, e.g., as described below.

Figure 3:
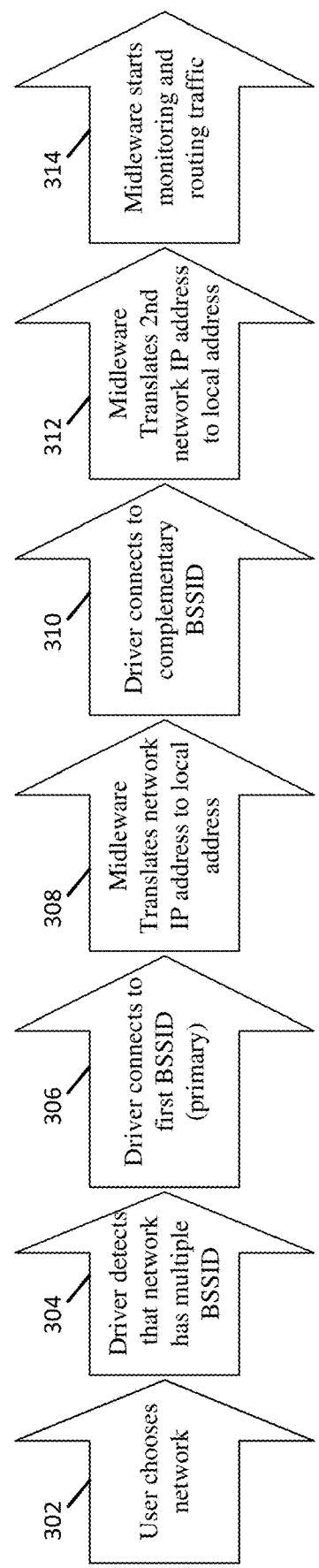
FIG. 3 is a schematic flow-chart illustration of a method of establishing a CMB network access, in accordance with some demonstrative embodiments.

Reference is made to FIG. 3, which schematically illustrates a flow chart illustration of a method of establishing a CMB network access, in accordance with some demonstrative embodiments. For example, one or more of the operations of the method of FIG. 3 may be performed by a wireless communication system, e.g., system 100 (FIG. 1); a wireless communication device, e.g., device 102 (FIG. 1); a controller, e.g., controller 124 (FIG. 1); a connection manager, e.g., CMB manager 232 (FIG. 2); a router, e.g., router 224 (FIG. 2); a driver, e.g., a driver 228 (FIG. 2); and/or an IP stack, e.g., IP stack 222 (FIG. 2).

In one example, the method of FIG. 3, may be implemented to establish a CMB network access for a first scenario of network access, e.g., concurrent connections via two wireless networks having a same SSID, e.g., as descried below.

In some demonstrative embodiments, as indicated at block 302, a user may choose and/or request to connect to a wireless communication network, e.g., as described below.

In some demonstrative embodiments, as indicated at block 304, a driver 228 (FIG. 2) may detect that the wireless communication network has a plurality of SSIDs, e.g., multiple BSSIDs.

In some demonstrative embodiments, as indicated at block 306, driver 228 (FIG. 2) may connect to a first wireless communication network using a first IP address, e.g., as a primary network, having a first SSID, e.g., a first BSSID.

In some demonstrative embodiments, as indicated at block 308, the first network IP address, e.g., corresponding to the first network, may be translated to a local address. For example, router 224 (FIG. 2) may be configured, e.g., as middleware (MW), to translate between first network IP address for an application stream and a local address to be presented to an application 225 (FIG. 2).

In some demonstrative embodiments, as indicated at block 310, driver 228 (FIG. 2) may connect to a second wireless communication network using a second IP address, e.g., as a complementary network, having the same SSID as the first network.

In some demonstrative embodiments, as indicated at block 312, the second network IP address, e.g., corresponding to the second network, may be translated to the local address. For example, router 224 (FIG. 2) may be configured, e.g., as MW, to translate between the second network IP address for the application stream and the local address to be presented to an application 225 (FIG. 2).

In some demonstrative embodiments, as indicated at block 314, traffic may be monitored and routed, for example, concurrently via the first and second wireless communication networks, e.g., by router 224 (FIG. 2).

In some demonstrative embodiments, one or more operations of the method of FIG. 3, may be implemented to provide a network pre-provisioning solution for managed corporate network, e.g., as described below.

In some demonstrative embodiments, a network provisioning authority may register the multiple MAC addresses of a single CMB UE device and may allocate a similar set of services for the UE, for example, regardless of being identified by any of its set of MAC addresses.

In some demonstrative embodiments, access to one or more APs, e.g., a Hotspot access, may require user credentials and/or acceptance of Terms and Conditions (T&C), which may be displayed on a user interface, for example, user interface 110 (FIG. 1), for example, on a captive portal, e.g., as described below.

Figure 4:
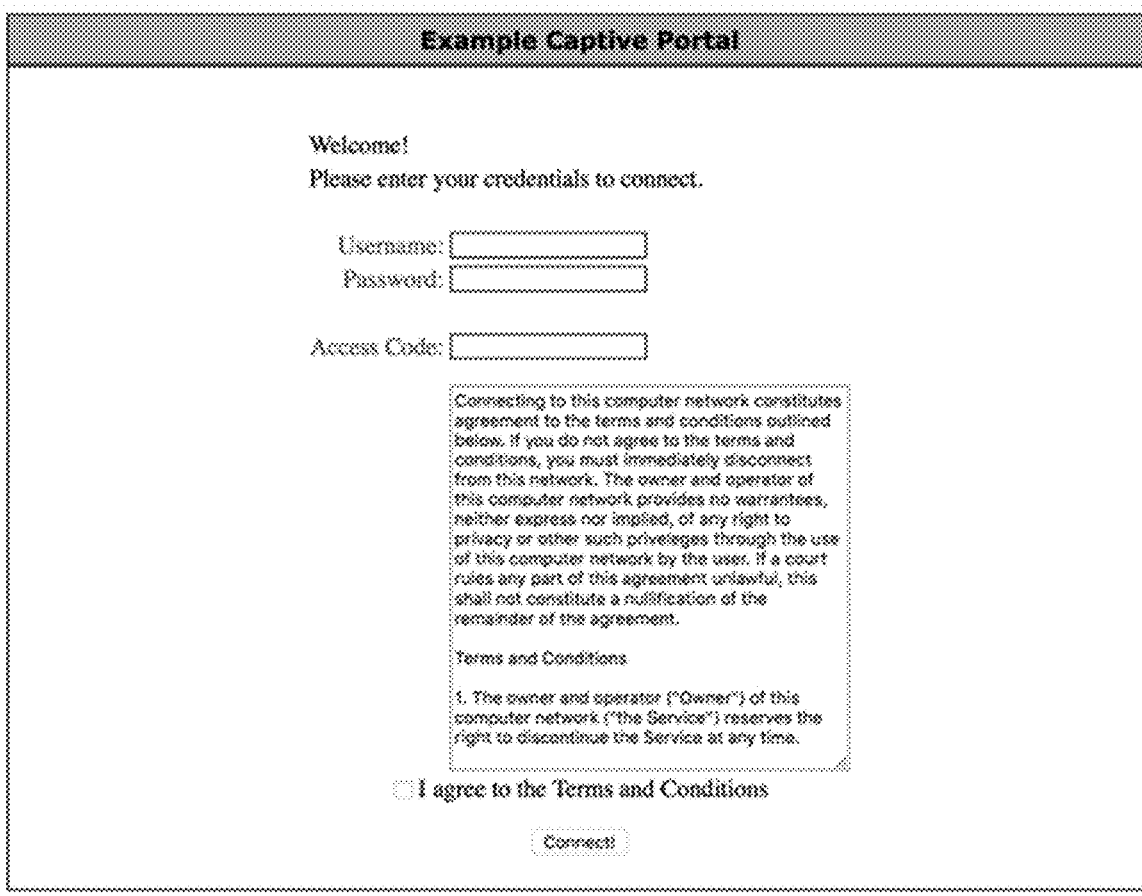
FIG. 4 is a schematic illustration of a user interface, in accordance with some demonstrative embodiments.

Reference is made to FIG. 4, which schematically illustrates a user interface 400, in accordance with some demonstrative embodiments.

In some demonstrative embodiments, as shown in FIG. 4, user interface 400 may include a captive portal configured for inputting user credentials and/or acceptance of T&C.

In some demonstrative embodiments, once a user connected to a hotspot using a primary connection, networking stack 222 (FIG. 2) of the UE, may identify additional portal requests, for example, to enter credentials or accept T&C and provide them, for example, without user intervention.

In one example, additional MAC addresses, which may be needed to provide credentials may meet a rule of be "known equivalent".

In some demonstrative embodiments, the networking stack 222 (FIG. 2) may reset and/or clear credentials for the captive portal, for example, once all connections to the captive portal may no longer be available.

In some demonstrative embodiments, user interface 110 (FIG. 1) may track and show the user a connection state and link quality per each connection.

In some demonstrative embodiments, a supplicant 234 (FIG. 2) of connection manager 232 (FIG. 2) may establish a secured connection to the concurrent links, for example, using credentials taken from a single user, an enterprise profile, a single SSID, and/or a single passphrase.

Figure 5:
FIG. 5 is a schematic illustration of a concurrent connections state interface, in accordance with some demonstrative embodiments.

Reference is made to FIG. 5, which schematically illustrates a concurrent connections state interface 500, in accordance with some demonstrative embodiments. For example, user interface 110 (FIG. 1) may be configured to provide one or more elements of interface 500.

In some demonstrative embodiments, as shown in FIG. 5, concurrent connections state interface 500 may include an icon 510 for each connection of the CMB.

In some demonstrative embodiments, icon 510 may be configured to indicate a connection state and a link quality of a connection, for example, by bolding one or more curved lines of icon 510 and/or using any other method.

Figure 6:
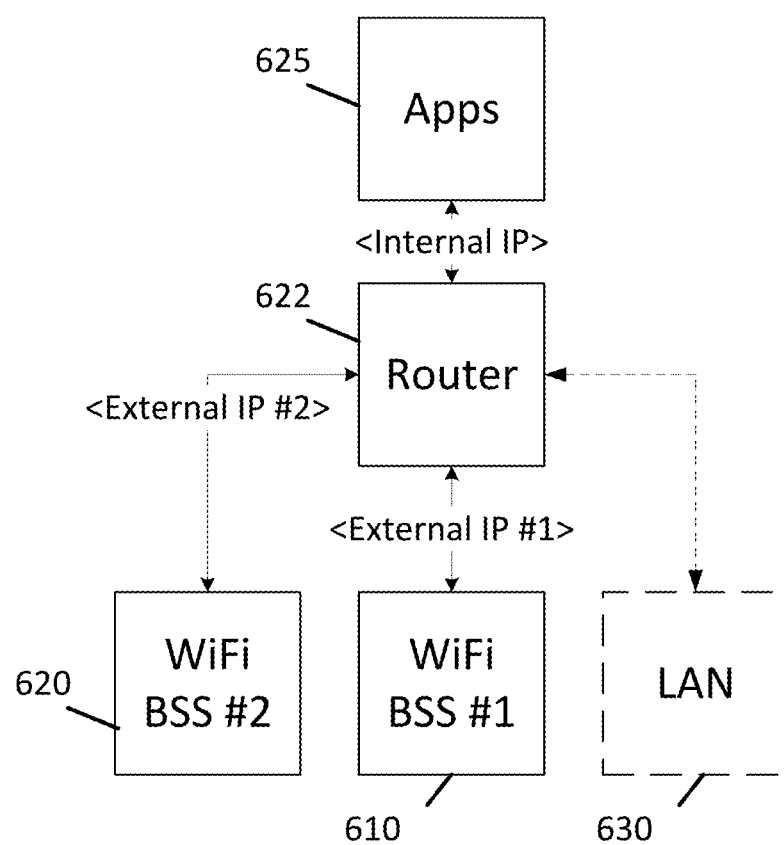
FIG. 6 is a schematic block diagram illustration of an address translation scheme, in accordance with some demonstrative embodiments.

Reference is made to FIG. 6, which schematically illustrates a block diagram of an address translation scheme 600, in accordance with some demonstrative embodiments.

In some demonstrative embodiments, as shown in FIG. 6, a router 624 may be configured to route traffic of one or more applications 625 via a plurality of connections, for example, including the first and second wireless network connections discussed above, e.g., as described below. For example, router 224 (FIG. 2) may be configured to perform one or more operations and/or functionalities of router 624.

In some demonstrative embodiments, as shown in FIG. 6, router 624 may route the traffic via a first BSS 610, denoted "BSS #1", a second BSS 620, denoted "BSS #2", and a LAN connection 630, denoted "LAN".

In some demonstrative embodiments, as shown in FIG. 6, router 624 may use first and second external IP addresses to route the traffic via BSS 610 and 620, e.g., as described above.

In some demonstrative embodiments, as shown in FIG. 6, router 624 may translate the external IP addresses into a local IP address to be used by the one or more applications 625.

Referring back to FIG. 2, in some demonstrative embodiments, the network stack 222 and/or driver 228 may be configured to support a multiplexing scheme for downlink, and/or a demultiplexing scheme for uplink, which may route an application stream, e.g., each application stream, to an appropriate connection, for example, according to connection availability, matching of capabilities to application uplink and downlink capacity, and/or QoS needs of the applications 225.

In some demonstrative embodiments, a platform power manager 236 may include decision logic, for example, to maintain all or part of available wireless connections, for example, considering tradeoffs between device power consumption and a battery life, and a quality of network access. For example, keeping only a single connection may be suitable, e.g., when the platform enters suspend mode, connected standby mode, or screen off mode.

In some demonstrative embodiments, the IP stack 222 may manage non-application related traffic, which may be required to maintain and/or modify connectivity on all layers of communication, and to determine, for example, per packet type, if packets should be transmitted on a specific link or all links. For example, IP stack 222 may manage address resolution protocol (ARPs) messages, keep alive messages, group addressed messages and/or any other additional or alternative control messages.

In some demonstrative embodiments, the IP stack 222 and/or driver 228 may be configured to track a wireless network status, a signal strength and/or capabilities, and/or to process periodic AP scan results. For example, once an opportunity to roam to a different AP may be detected, a device, e.g., device 102 (FIG. 1), may consider its co-running capabilities and/or constrains, for example, to avoid any attempt to multiple links that might create interference to each other. For example, if the device, e.g., device 102 (FIG. 1), only supports multiple links of different bands, roaming from an AP on one band to an AP on another band, which is served by the other radio, may be prohibited.

In some demonstrative embodiments, the connection manager 232 and/or device driver 228 may optimize AP and/or band selection, for example, using one or more mobility indications, which may be obtained from tracking an AP signal strength over time and/or from additional inputs, e.g., inertial sensor inputs or any other inputs of device 102 (FIG. 1).

In one example, transition of traffic between wireless communication frequency bands in connection to a single home multiband AP may be based, for example, on an assessment of radial vector of a mobile user.

In another example, transition of traffic between wireless communication frequency bands in an enterprise environment, may be based, for example, upon coverage of network per band, e.g., moving between floors during an active voice and/or video call while the staircase or elevator only have network coverage on a single band.

In some demonstrative embodiments, device 102 (FIG. 1) may be configured to support a second scenario of network access, in which AP #1 and AP #2 may be collocated or non-collocated, having different SSIDs and different security credentials, and operating on different bands, e.g., as described below.

Figure 7:
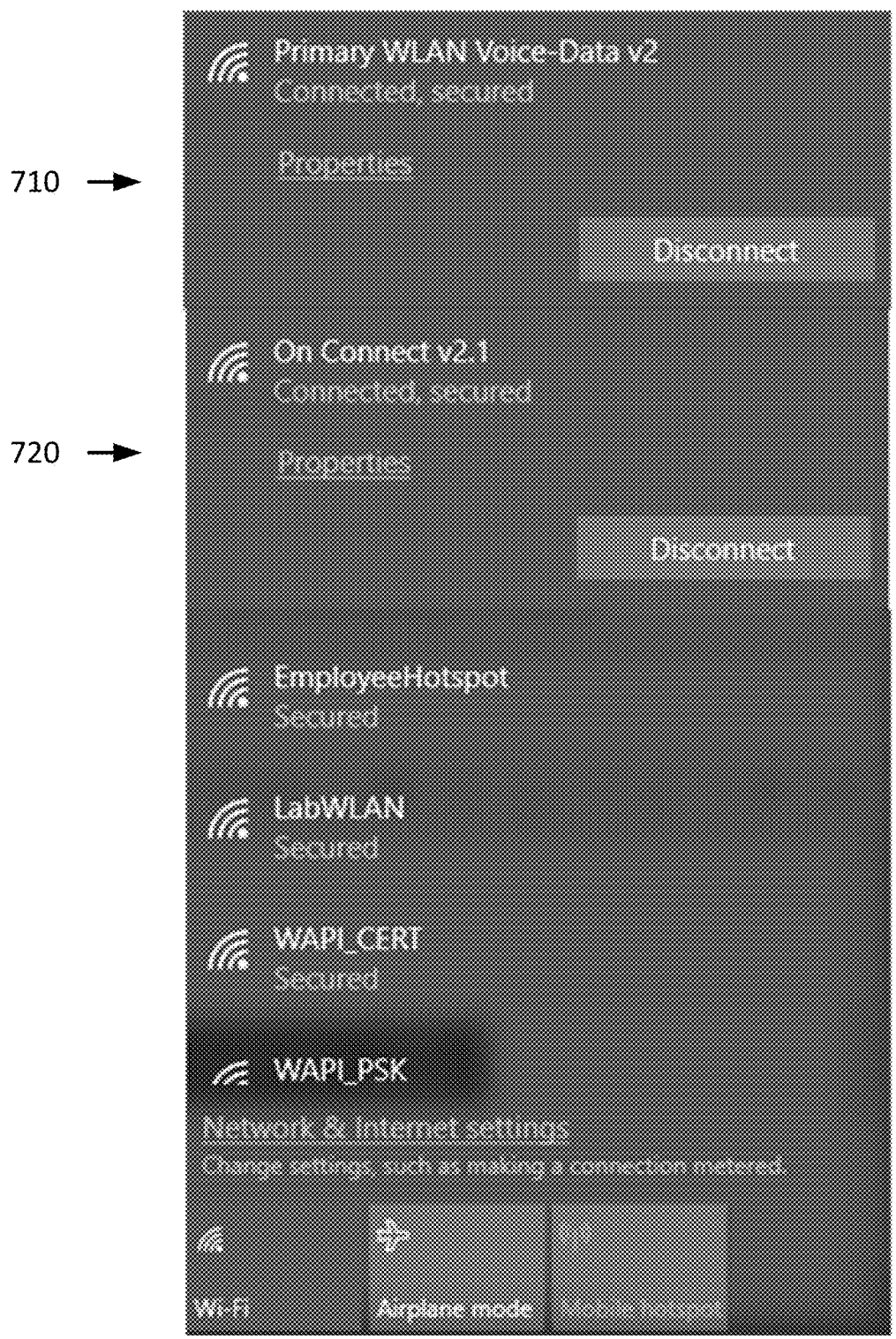
FIG. 7 is a schematic illustration of a user interface to indicate concurrent network connections, in accordance with some demonstrative embodiments.

Reference is made to FIG. 7, which schematically illustrates an interface 700 to indicate concurrent network connections, in accordance with some demonstrative embodiments.

In one example, user interface 110 (FIG. 1) may be configured to display and/or provide to a user one or more elements of interface 700.

In some demonstrative embodiments, as shown in FIG. 7, interface 700 may indicate a concurrent network connection to two wireless networks having different SSIDs. For example, window 700 may indicate concurrent connections via a first wireless network 710 having a first SSID, denoted "Primary WLAN Voice-Data v2", and via a second wireless network 720 having a second SSID, denoted "On Connect v2.1".

Figure 8:
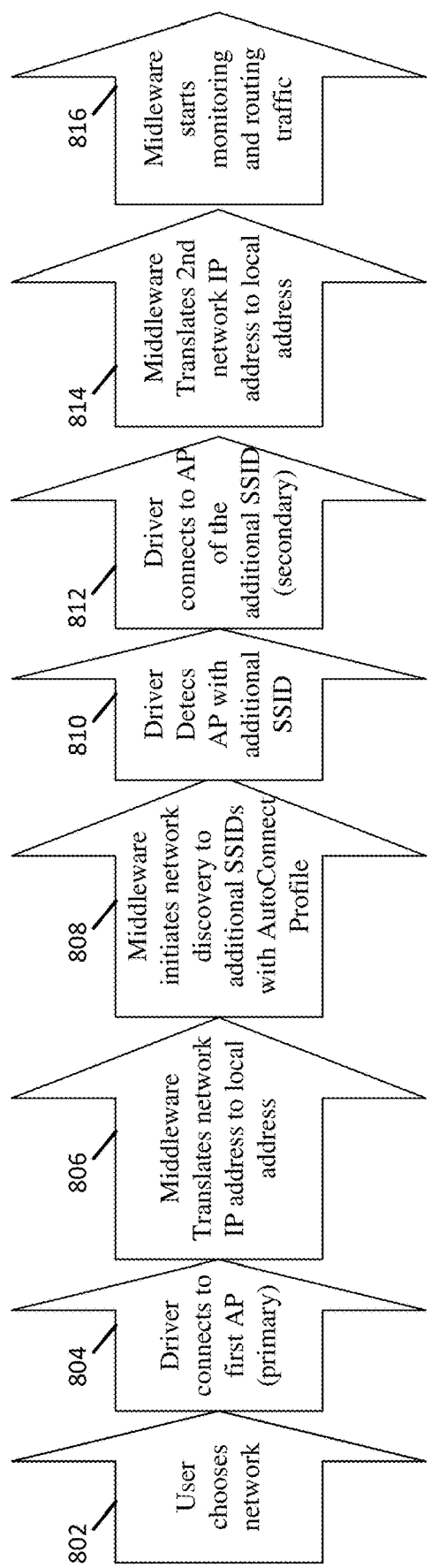
FIG. 8 is a schematic flow-chart illustration of a method of establishing a CMB network access, in accordance with some demonstrative embodiments.

Reference is made to FIG. 8, which schematically illustrates a flow chart of a method of establishing a CMB network access, in accordance with some demonstrative embodiments. For example, one or more of the operations of the method of FIG. 8 may be performed by a wireless communication system, e.g., system 100 (FIG. 1); a wireless communication device, e.g., device 102 (FIG. 1); a controller, e.g., controller 124 (FIG. 1); or a connection manager, e.g., CMB manager 232 (FIG. 2); a router, e.g., router 224 (FIG. 2); a driver, e.g., driver 228 (FIG. 2); and/or an IP stack, e.g., IP stack 22 (FIG. 2).

In one example, one or more of the operations of the method of FIG. 8 may be implemented to establish a concurrent connection for a second scenario of network access, e.g., concurrent wireless connections via two wireless communication networks having different SSIDs.

In some demonstrative embodiments, as indicated at block 802, a user may select and/or request to connect to a first wireless communication network having a first SSID.

In some demonstrative embodiments, as indicated at block 804, driver 228 (FIG. 2) may connect to the first network having the first SSID, for example, using a first network IP address.

In some demonstrative embodiments, as indicated at block 806, the first network IP address, e.g., corresponding to the first network, may be translated to a local address. For example, router 224 (FIG. 2) may be configured, e.g., as MW, to translate between first network IP address for an application stream and a local address to be presented to an application 225 (FIG. 2). In some demonstrative embodiments, as indicated at block 808, a network discovery procedure may be initiated, e.g., by the MW and/or by driver 228 (FIG. 2), to discover additional wireless networks with an Autoconnect profile.

In some demonstrative embodiments, as indicated at block 810, a second network having a second SSID may be detected, e.g., by driver 228 (FIG. 2).

In some demonstrative embodiments, as indicated at block 812, driver 228 (FIG. 2) may connect to the second network having the second SSID, e.g., using a second IP address.

In some demonstrative embodiments, as indicated at block 814, the second network IP address, e.g., corresponding to the second network, may be translated to the local address. For example, router 224 (FIG. 2) may be configured, e.g., as MW, to translate between the second network IP address for the application stream and the local address to be presented to an application 225 (FIG. 2).

In some demonstrative embodiments, as indicated at block 816, traffic may be monitored and routed, for example, concurrently via the first and second wireless communication networks, e.g., by router 224 (FIG. 2).

In some demonstrative embodiments, a network stack, e.g., network stack 222 (FIG. 2), may be configured to support for the second scenario some or all of the operations described above with respect to the first scenario.

In some demonstrative embodiments, a network stack, e.g., network stack 222 (FIG. 2), may be configured to manage a connection, for example, using multiple profiles and/or multiple sets of user credentials and preferences, e.g., auto connect preferences and/or any other preferences.

In some demonstrative embodiments, a network stack, e.g., network stack 222 (FIG. 2), may be configured to avoid establishing multiple connections, for example, if they may cause radio interference to each other.

In some demonstrative embodiments, a network stack, e.g., network stack 222 (FIG. 2), may be configured to detect APs without network access, and to avoid connections to these APs.

In some demonstrative embodiments, a network stack, e.g., network stack 222 (FIG. 2), may be configured to support applying of IT provisioning rules for mapping specific application data to corporate networks.

In some demonstrative embodiments, a network stack, e.g., network stack 222 (FIG. 2), may be configured to identify network security and type, and to route traffic accordingly, for example, to avoid a risk of unsecured access.

In some demonstrative embodiments, a network stack, e.g., network stack 222 (FIG. 2), may be configured to support establishing of an IP security (IPsec) tunnel over a proper link, for example, when Virtual Private Network (VPN) connection is requested or enforced.

Figure 9:
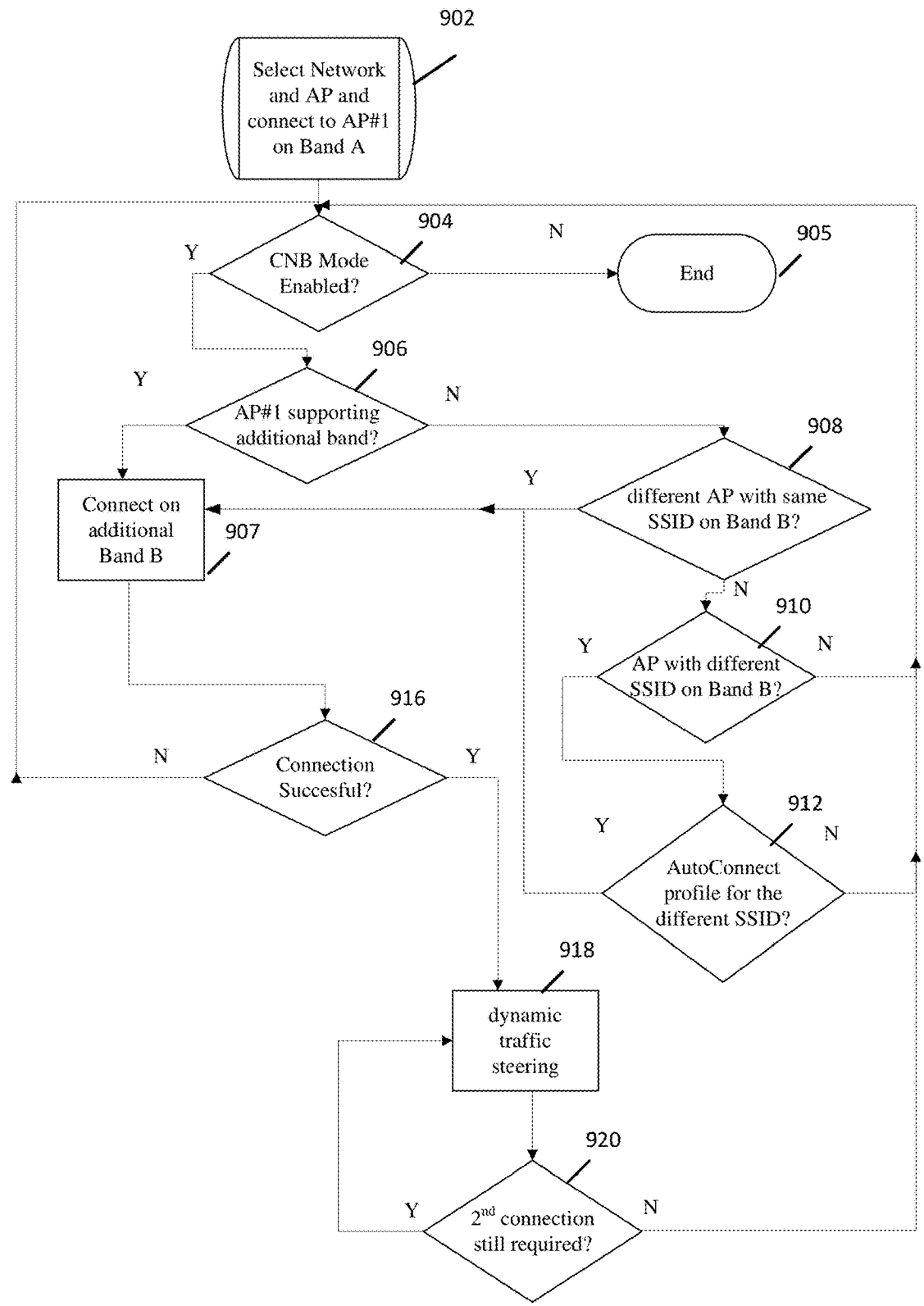
FIG. 9 is a schematic flow-chart illustration of a method of CMB network access, in accordance with some demonstrative embodiments.

Reference is made to FIG. 9, which schematically illustrates a flow chart of a method of CMB network access, in accordance with some demonstrative embodiments. For example, one or more of the operations of the method of FIG. 9 may be performed by one or more elements of a wireless communication system, e.g., system 100 (FIG. 1); a wireless communication device, e.g., device 102 (FIG. 1); a controller, e.g., controller 124 (FIG. 1); a router, e.g., router 224 (FIG. 2); a connection manager, e.g., CMB manager 232 (FIG. 2); a driver, e.g., driver 228 (FIG. 2); and/or an IP stack, e.g., IP stack 22 (FIG. 2).

As indicated at block 902, the method may include selecting a first wireless connection over a first wireless network connection with a first AP in a first wireless communication frequency band, e.g., as described above.

As indicated at block 904, the method may include determining whether or not a CMB mode is enabled at the wireless communication device.

As indicated at block 905, the method may be terminated, for example, when the CMB mode is not enabled at the wireless communication device.

In some demonstrative embodiments, the method may include searching for a second wireless network for establishing another concurrent wireless network connection in another wireless communication band, for example, if the CMB mode is supported, e.g., as described below.

As indicated at block 906, the method may include determining whether or not the first AP supports a second wireless frequency band, for example, when the CMB mode is enabled at the wireless communication device.

As indicated at block 907, the method may include establishing a second wireless network connection, e.g., via the first AP, over the second wireless frequency band, for example, when the first AP supports the second wireless frequency band.

As indicated at block 908, the method may include determining whether or not there is a second AP, which uses the first SSID, and which supports a second wireless frequency band, for example, when the first AP does not support the second wireless frequency band.

As indicated at block 907, the method may include establishing a second wireless network connection, e.g., via the second AP, over the second wireless frequency band, for example, when detecting the second AP, which uses the first SSID, and which supports a second wireless frequency band.

As indicated at block 910, the method may include determining whether or not there is a second AP which uses a second, different, SSID, e.g., different from the first SSID, and which supports a second wireless frequency band, for example, when a second AP, which uses the first SSID, and which supports a second wireless frequency band, is not found.

As indicated at block 912, the method may include determining whether or not there is an Autoconnect profile for the second SSID, for example, when the second AP which uses the second SSID, and which supports a second wireless frequency band is found.

As indicated at block 907, the method may include establishing a second wireless network connection, e.g., via the second AP, over the second wireless frequency band, for example, based on the Autoconnect profile for the second SSID, for example, when detecting the second AP, which uses the second SSID, and which supports a second wireless frequency band.

As indicated at block 916, the method may include determining whether or not the second wireless network connection in the second wireless frequency band is successfully established.

As indicated at block 918, the method may include dynamically routing traffic between the first and second wireless network connections, e.g., for example, when the second wireless network connection is successfully established, e.g., concurrent with the first wireless network connection.

As indicated at block 920, the method may include selecting whether to continue or disable the concurrent network access via the first and second wireless network connections, for example, based on one or more criteria, e.g., as described above.

Figure 10:
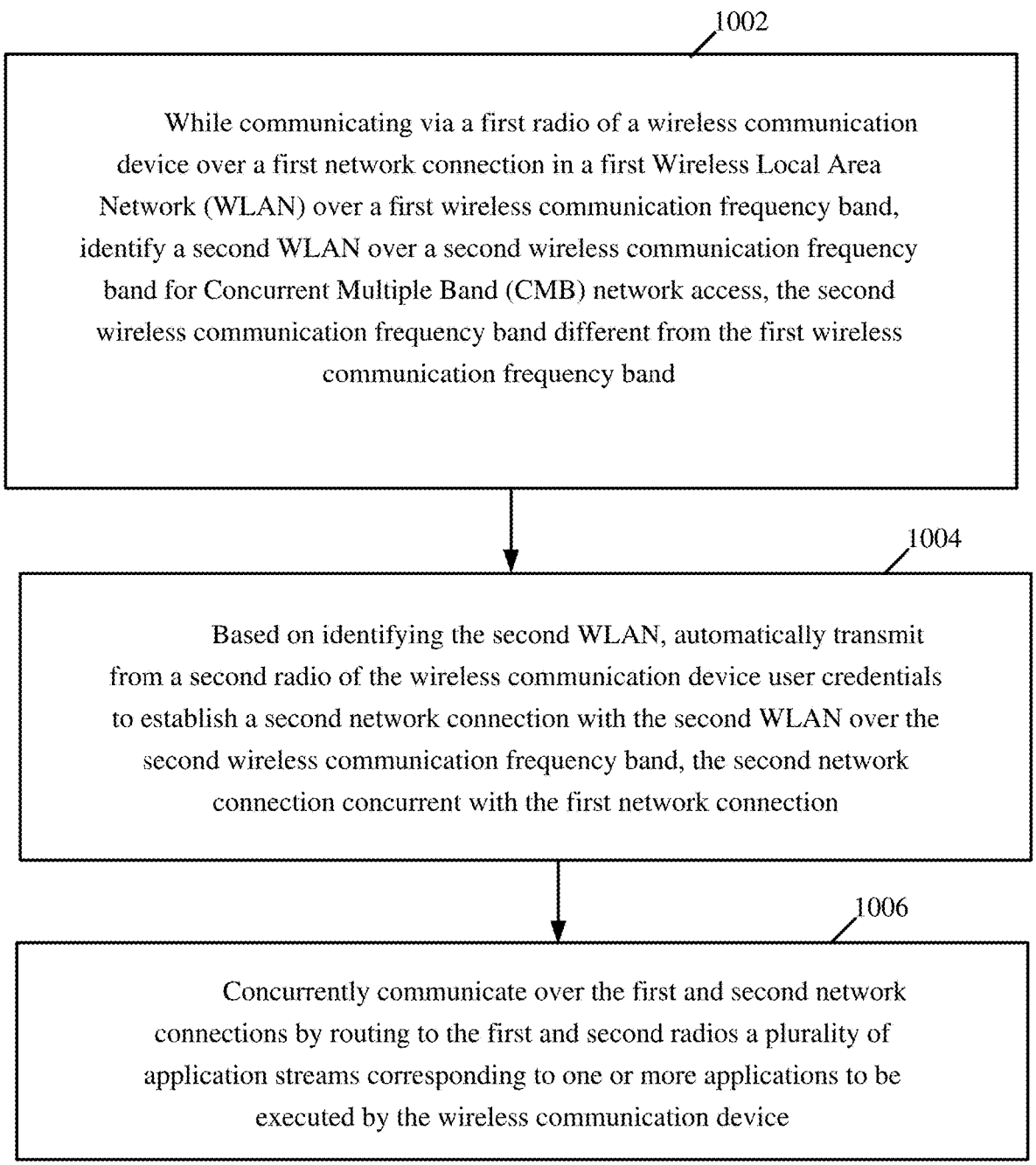
FIG. 10 is a schematic flow-chart illustration of a method of CMB network access, in accordance with some demonstrative embodiments.

Reference is made to FIG. 10, which schematically illustrates a method of concurrently communicating over first and second networks, in accordance with some demonstrative embodiments. For example, one or more of the operations of the method of FIG. 10 may be performed by a wireless communication system, e.g., system 100 (FIG. 1); a wireless communication device, e.g., device 102 (FIG. 1); a controller, e.g., controller 124 (FIG. 1); a router, e.g., router 224 (FIG. 2); a connection manager, e.g., CMB manager 232 (FIG. 2); a driver, e.g., driver 228 (FIG. 2); and/or an IP stack, e.g., IP stack 22 (FIG. 2).

As indicated at block 1002, the method may include, while communicating via a first radio of a wireless communication device over a first network connection in a first WLAN over a first wireless communication frequency band, identifying a second WLAN over a second wireless communication frequency band for CMB network access, the second wireless communication frequency band different from the first wireless communication frequency band. For example, controller 124 (FIG. 1) may control, cause and/or trigger the STA implemented by device 102 (FIG. 1) to, while communicating via the first radio 114 (FIG. 1) of device 102 (FIG. 1) over the first network connection in the first WLAN over the first wireless communication frequency band, identify the second WLAN over the second wireless communication frequency band for the CMB network access, e.g., as described above.

As indicated at block 1004, the method may include, based on identifying the second WLAN, automatically transmitting from a second radio of the wireless communication device user credentials to establish a second network connection with the second WLAN over the second wireless communication frequency band, the second network connection concurrent with the first network connection. For example, controller 124 (FIG. 1) may control, cause and/or trigger the STA implemented by device 102 (FIG. 1) to, based on identifying the second WLAN, automatically transmit from the second radio 114 (FIG. 1) of device 102 (FIG. 1) the user credentials to establish the second network connection with the second WLAN over the second wireless communication frequency band, e.g., as described above.

As indicated at block 1006, the method may include concurrently communicating over the first and second network connections by routing to the first and second radios a plurality of application streams corresponding to one or more applications to be executed by the wireless communication device. For example, controller 124 (FIG. 1) may control, cause and/or trigger the STA implemented by device 102 (FIG. 1) to concurrently communicate over the first and second network connections by routing to the first and second radios 114 (FIG. 1) of device 102 (FIG. 1) the plurality of application streams corresponding to the one or more applications 125 (FIG. 1) to be executed by device 102 (FIG. 1), e.g., as described above.

Figure 11:
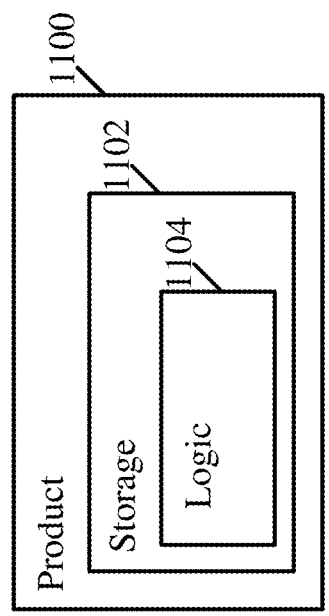
FIG. 11 is a schematic illustration of a product of manufacture, in accordance with some demonstrative embodiments.

Reference is made to FIG. 11, which schematically illustrates a product of manufacture 1100, in accordance with some demonstrative embodiments. Product 1100 may include one or more tangible computer-readable ("machine readable") non-transitory storage media 1102, which may include computer-executable instructions, e.g., implemented by logic 1104, operable to, when executed by at least one processor, e.g., computer processor, enable the at least one processor to implement one or more operations at device 102 (FIG. 1), controller 124 (FIG. 1), router 224 (FIG. 3), and/or connection manager 234 (FIG. 2), driver 228 (FIG. 2), IP stack 222 (FIG. 2), to cause device 102 (FIG. 1), controller 124 (FIG. 1), router 224 (FIG. 2), driver 228 (FIG. 2), IP stack 222 (FIG. 2), and/or connection manager 234 (FIG. 2) to perform one or more operations, and/or to perform, trigger and/or implement one or more operations, communications and/or functionalities described above with reference to FIGS. 1, 2, 3, 4, 5, 6, 7, 8, 9 and/or 10, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1100 and/or storage media 1102 may include one or more types of computer-readable storage media capable of storing data, including volatile memory, non-volatile memory, removable or non-removable memory, erasable or non-erasable memory, writeable or re-writeable memory, and the like. For example, storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus including logic and circuitry configured to cause a wireless communication device to, while communicating via a first radio of the wireless communication device over a first network connection in a first Wireless Local Area Network (WLAN) over a first wireless communication frequency band, identify a second WLAN over a second wireless communication frequency band for Concurrent Multiple Band (CMB) network access, the second wireless communication frequency band different from the first wireless communication frequency band; based on identifying the second WLAN, automatically transmit from a second radio of the wireless communication device user credentials to establish a second network connection with the second WLAN over the second wireless communication frequency band, the second network connection concurrent with the first network connection; and concurrently communicate over the first and second network connections by routing to the first and second radios a plurality of application streams corresponding to one or more applications to be executed by the wireless communication device.

Example 2 includes the subject matter of Example 1, and optionally, wherein the apparatus is configured to cause the wireless communication device to map a first Internet Protocol (IP) address and a second IP address to a same local IP address for use by the one or more applications, the first IP address for communication by the first radio over the first network connection, the second IP address for communication by the second radio over the second network connection.

Example 3 includes the subject matter of Example 1 or 2, and optionally, wherein the first and second WLANs share a same Service Set Identifier (SSID) and share a same Dynamic Host Configuration Protocol (DHCP) server.

Example 4 includes the subject matter of Example 3, and optionally, wherein the apparatus is configured to cause the wireless communication device to automatically transmit to the second WLAN user credentials of the first network connection.

Example 5 includes the subject matter of Example 3 or 4, and optionally, wherein the apparatus is configured to cause the wireless communication device to establish the second network connection using same security credentials of the first network connection.

Example 6 includes the subject matter of Example 1 or 2, and optionally, wherein the first WLAN has a first Service Set Identifier (SSID), and the second WLAN has a second SSID different from the first SSID.

Example 7 includes the subject matter of Example 6, and optionally, wherein the apparatus is configured to cause the wireless communication device to automatically retrieve a user profile corresponding to the second SSID from a memory of the wireless communication device, the user profile comprising user credentials corresponding to the second SSID, and to transmit to the second WLAN the user credentials corresponding to the second SSID.

Example 8 includes the subject matter of Example 7, and optionally, wherein the apparatus is configured to cause the wireless communication device to automatically retrieve from the user profile security credentials corresponding to the second SSID, and to establish the second network connection using the security credentials corresponding to the second SSID.

Example 9 includes the subject matter of any one of Examples 1-8, and optionally, wherein the apparatus is configured to cause a user interface of the wireless communication device to provide to a user of the wireless communication device a concurrent connection indication to concurrently indicate a connection state of the first and second network connections.

Example 10 includes the subject matter of any one of Examples 1-9, and optionally, wherein the apparatus is configured to cause the wireless communication device to selectively enable or disable the CMB network access based on one or more predefined criteria.

Example 11 includes the subject matter of any one of Examples 1-10, and optionally, wherein the apparatus is configured to cause the wireless communication device to selectively enable or disable the CMB network access based on a power mode of the wireless communication device.

Example 12 includes the subject matter of any one of Examples 1-11, and optionally, wherein the apparatus is configured to cause the wireless communication device to selectively enable or disable the CMB network access based on an interference between the first and second network connections.

Example 13 includes the subject matter of any one of Examples 1-12, and optionally, wherein the apparatus is configured to cause the wireless communication device to selectively enable or disable the CMB network access based on at least one of a throughput criterion, a latency criterion, a stability criterion, or a channel condition criterion, the throughput criterion relating to a required throughput for the application streams and an available throughput of at least one of the first and second network connections, the latency criterion relating to a required latency for the application streams and a latency of at least one of the first and second network connections, the stability criterion relating to a stability of at least one of the first and second network connections, and the network condition criterion relating to a channel condition of at least one of the first and second network connections.

Example 14 includes the subject matter of any one of Examples 1-13, and optionally, wherein the first and second network connections are with a same Access Point (AP).

Example 15 includes the subject matter of any one of Examples 1-13, and optionally, wherein the first network connection is with a first Access Point (AP), and the second network connection is with a second AP.

Example 16 includes the subject matter of any one of Examples 1-15, and optionally, wherein the user credentials to establish the second network connection comprise at least one of a username, a password, a Media Access Control (MAC) address, a device barcode, an access code, or an acceptance of terms and conditions.

Example 17 includes the subject matter of any one of Examples 1-16, and optionally, wherein the first wireless communication frequency band is a first sub-band in a particular frequency band, and the second wireless communication frequency band is a second sub-band in the particular frequency band.

Example 18 includes the subject matter of any one of Examples 1-17, and optionally, wherein at least one of the first and second wireless communication frequency bands comprises a 2.4 Gigahertz (GHz) band, a 5 GHz band, or a 6-7 GHz band.

Example 19 includes the subject matter of any one of Examples 1-18, and optionally, comprising the first and second radios.

Example 20 includes the subject matter of Example 19, and optionally, comprising one or more antennas connected to the first and second radios, a memory to store data processed by the wireless communication device, and a processor to execute instructions of the one or more applications.

Example 21 comprises an apparatus comprising means for executing any of the described operations of Examples 1-20.

Example 22 comprises a machine-readable medium that stores instructions for execution by a processor to perform any of the described operations of Examples 1-20.

Example 23 comprises an apparatus comprising: a memory interface; and processing circuitry configured to: perform any of the described operations of Examples 1-20.

Example 24 comprises a method to perform any of the described operations of Examples 1-20.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor comprising logic and circuitry configured to cause a wireless communication device to:
while a first radio of the wireless communication device is connected via a first network connection for communication in a first Wireless Local Area Network (WLAN) over a first wireless communication frequency band, identify a second WLAN over a second wireless communication frequency band, the second wireless communication frequency band different from the first wireless communication frequency band;
based on a determination to connect to the second WLAN for Concurrent Multiple Band (CMB) network access, automatically transmit from a second radio of the wireless communication device user credentials to establish a second network connection with the second WLAN over the second wireless communication frequency band, the second network connection concurrent with the first network connection; and
route a plurality of application streams to the first and second radios for communication over the concurrent first and second network connections; and
a memory to store data processed by the processor.

2. The apparatus of claim 1 configured to cause the wireless communication device to determine whether or not to enable the CMB network access with the first and second network connections based on at least one criterion.

3. The apparatus of claim 2, wherein the at least one criterion comprises a power mode criterion corresponding to a power mode of the wireless communication device.

4. The apparatus of claim 2, wherein the at least one criterion comprises an interference criterion corresponding to an interference between the first and second network connections.

5. The apparatus of claim 2, wherein the at least one criterion comprises a throughput criterion relating to a required throughput for one or more of the plurality of application streams.

6. The apparatus of claim 2, wherein the at least one criterion comprises a latency criterion relating to a required latency for one or more of the plurality of application streams.

7. The apparatus of claim 2, wherein the at least one criterion comprises a stability criterion relating to a stability of at least one of the first network connection or the second network connection.

8. The apparatus of claim 2, wherein the at least one criterion comprises a channel condition criterion relating to a channel condition of at least one of the first network connection or the second network connection.

9. The apparatus of claim 1, wherein the first and second WLANs share a same Service Set Identifier (SSID).

10. The apparatus of claim 9 configured to cause the wireless communication device to, based on the determination to connect to the second WLAN for the CMB network access, automatically transmit to the second WLAN user credentials of the first network connection.

11. The apparatus of claim 9 configured to cause the wireless communication device to establish the second network connection using security credentials of the first network connection.

12. The apparatus of claim 1, wherein the first WLAN has a first Service Set Identifier (SSID), and the second WLAN has a second SSID different from the first SSID.

13. The apparatus of claim 12 configured to cause the wireless communication device to retrieve a user profile corresponding to the second SSID from a memory of the wireless communication device, and based on the user profile, to determine the user credentials to establish the second network connection with the second WLAN over the second wireless communication frequency band.

14. The apparatus of claim 13 configured to cause the wireless communication device to retrieve from the user profile security credentials corresponding to the second SSID, and to establish the second network connection using the security credentials corresponding to the second SSID.

15. The apparatus of claim 1 configured to cause the wireless communication device to map a first Internet Protocol (IP) address and a second IP address to a local IP address for one or more applications executed by the wireless communication device, the first IP address for communication by the first radio over the first network connection, the second IP address for communication by the second radio over the second network connection.

16. The apparatus of claim 1 configured to cause a user interface of the wireless communication device to provide to a user of the wireless communication device a concurrent connection indication to concurrently indicate a connection state of the first and second network connections.

17. The apparatus of claim 1, wherein the first and second network connections are with a same Access Point (AP).

18. The apparatus of claim 1, wherein the first network connection is with a first Access Point (AP), and the second network connection is with a second AP.

19. The apparatus of claim 1, wherein the user credentials to establish the second network connection comprise at least one of a username, a password, a Media Access Control (MAC) address, a device barcode, an access code, or an acceptance of terms and conditions.

20. The apparatus of claim 1, wherein at least one of the first wireless communication frequency band or the second wireless communication frequency band comprises a 2.4 Gigahertz (GHz) band, a 5 GHz band, or a 6-7 GHz band.

21. The apparatus of claim 1 comprising the first and second radios.

22. A product comprising one or more tangible computer-readable non-transitory storage media comprising computer-executable instructions operable to, when executed by at least one processor, enable the at least one processor to cause a wireless communication device to:

while a first radio of the wireless communication device is connected via a first network connection for communication in a first Wireless Local Area Network (WLAN) over a first wireless communication frequency band, identify a second WLAN over a second wireless communication frequency band, the second wireless communication frequency band different from the first wireless communication frequency band;

based on a determination to connect to the second WLAN for Concurrent Multiple Band (CMB) network access, automatically transmit from a second radio of the wireless communication device user credentials to establish a second network connection with the second WLAN over the second wireless communication frequency band, the second network connection concurrent with the first network connection; and route a plurality of application streams to the first and second radios for communication over the concurrent first and second network connections.

23. The product of claim 22, wherein the instructions, when executed, cause the wireless communication device to determine whether or not to enable the CMB network access with the first and second network connections based on at least one criterion.

24. The product of claim 22, wherein the first and second WLANs share a same Service Set Identifier (SSID).

* * * * *